United States Patent
Shekhar et al.

(10) Patent No.: US 12,335,836 B2
(45) Date of Patent: Jun. 17, 2025

(54) PROVISIONING USER EQUIPMENT ROUTE SELECTION POLICIES WITH SERVICE ASSURANCE

(71) Applicant: Cisco Technology, Inc., San Jose, CA (US)

(72) Inventors: Ravi Shekhar, Pune (IN); Vimal Srivastava, Bangalore (IN)

(73) Assignee: Cisco Technology, Inc.

( * ) Notice: Subject to any disclaimer, the term of this patent is extended or adjusted under 35 U.S.C. 154(b) by 397 days.

(21) Appl. No.: 17/813,197

(22) Filed: Jul. 18, 2022

(65) Prior Publication Data

US 2024/0022989 A1    Jan. 18, 2024

(51) Int. Cl.
    *H04W 40/02*    (2009.01)
(52) U.S. Cl.
    CPC .................................. *H04W 40/02* (2013.01)
(58) Field of Classification Search
    CPC ...................................................... H04W 40/02
    USPC ........................................................ 455/422
    See application file for complete search history.

(56) References Cited

U.S. PATENT DOCUMENTS

| | | | |
|---|---|---|---|
| 2018/0324577 A1* | 11/2018 | Faccin | H04W 36/0079 |
| 2019/0268835 A1 | 8/2019 | Shan et al. | |
| 2020/0412559 A1 | 12/2020 | Tang | |
| 2021/0281993 A1* | 9/2021 | Tiwari | H04W 60/04 |
| 2021/0306912 A1 | 9/2021 | Stojanovski et al. | |
| 2021/0329714 A1 | 10/2021 | Zhang et al. | |
| 2023/0217542 A1* | 7/2023 | Abdelmalek | H04W 76/20 370/329 |

FOREIGN PATENT DOCUMENTS

| | | | |
|---|---|---|---|
| WO | WO-2020164567 A1 * | 8/2020 | |
| WO | 2022052037 A1 | 3/2022 | |
| WO | WO-2022069989 A1 * | 4/2022 | H04L 45/306 |

OTHER PUBLICATIONS

Translation WO 202016457 (Year: 2020).*

* cited by examiner

*Primary Examiner* — Ted M Wang

(74) *Attorney, Agent, or Firm* — Merchant & Gould P.C.

(57) ABSTRACT

Provisioning User Equipment (UE) Route Selection Policies (URSP) may be provided. A policy of a user equipment (UE) may be updated by a Policy Control Function (PCF). Then, the PCF may create a UE route selection policy (URSP) based on the updated UE policy. Next, the PCF may set a flag in in the URSP that may indicate to the UE that the URSP is applicable for new sessions and inapplicable for ongoing sessions. The PCF may then send the URSP to the UE, wherein the UE applies the URSP for new sessions.

20 Claims, 4 Drawing Sheets

PROVISIONING USER EQUIPMENT ROUTE SELECTION POLICIES WITH SERVICE ASSURANCE

TECHNICAL FIELD

The present disclosure relates generally to provisioning user equipment route selection policies, and more specifically provisioning user equipment route selection policies without interrupting ongoing sessions when moving from a Fourth Generation (4G) network to a Fifth Generation (5G) network.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
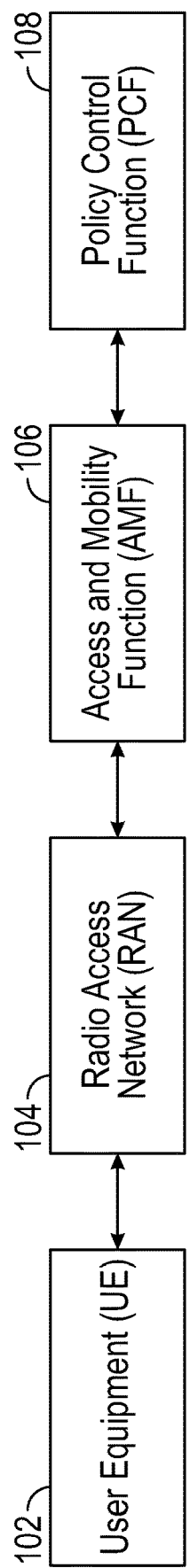
FIG. 1 is a block diagram of an operating environment for provisioning user equipment route selection policies.

Provisioning User Equipment (UE) Route Selection Policies (URSP) may be provided. A policy of a user equipment (UE) may be updated by a Policy Control Function (PCF). Then, the PCF may create a UE route selection policy (URSP) based on the updated UE policy. Next, the PCF may set a flag in in the URSP that may indicate to the UE that the URSP is applicable for new sessions and inapplicable for ongoing sessions. The PCF may then send the URSP to the UE, wherein the UE applies the URSP for new sessions.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the 5G System (5GS) design, many triggers are identified in the specification for User Equipment (UE) Route Selection Policy (URSP) provisioning (e.g., $3^{rd}$ Generation Partnership Project (3GPP) Clause 6.1.2.2.2 of 23.503). When the UE moves from a 4G network to a 5G network, the UE may trigger a URSP provisioning procedure. The UE triggered URSP provisioning procedure may be completed via initial registration in 5GS or via a mobility registration update. While the UE may fetch the URSP using the initial registration procedure in 5GS, this process may interrupt the ongoing sessions of the UE that are not using the URSP.

FIG. 1 is a block diagram of an operating environment 100 for provisioning user equipment route selection policies. The operating environment 100 includes a UE 102, a Radio Access Network (RAN) 104, an Access and Mobility Function (AMF) 106, and a Policy Control Function (PCF) 108.

The UE 102 may connect to a 4G network and/or a 5G network by communicating with the RAN 104. The UE 102 may send information to and receive information from the PCF 108 via the RAN 104 and the AMF 106. The PCF 108 may determine to update a policy of the UE 102, such as when the UE 102 is moving from a 4G network to a 5G network for example. The PCF 108 may create a URSP based on the updated UE policy. The PCF 108 may also set a flag in in the URSP that indicates to the UE 102 that the URSP may be applicable for all sessions or the URSP is applicable for new sessions and inapplicable for ongoing sessions. The PCF 108 may then send the URSP to the UE 102 via the AMF 106 and the RAN 104. The UE 102 may then apply the URSP rules in the URSP to either all sessions or only new sessions based on the value the PCF 108 set the flag.

The PCF 108 may also set the flag to indicate to the UE 102 that URSP is applicable for only new sessions and not applicable for ongoing session when a non-compatible UE policy is updated. For example, the updated UE policy may be based on 3GPP access meant for a 5G network connection, the updated UE policy may be non-compatible for a 4G network connection. Thus, when the UE 102 is moving from a 4G network to a 5G network, the updated UE policy may be non-compatible for ongoing sessions that are connected to the 4G network because the updated UE policy may be updated for the standards of the 5G network.

Figure 2:
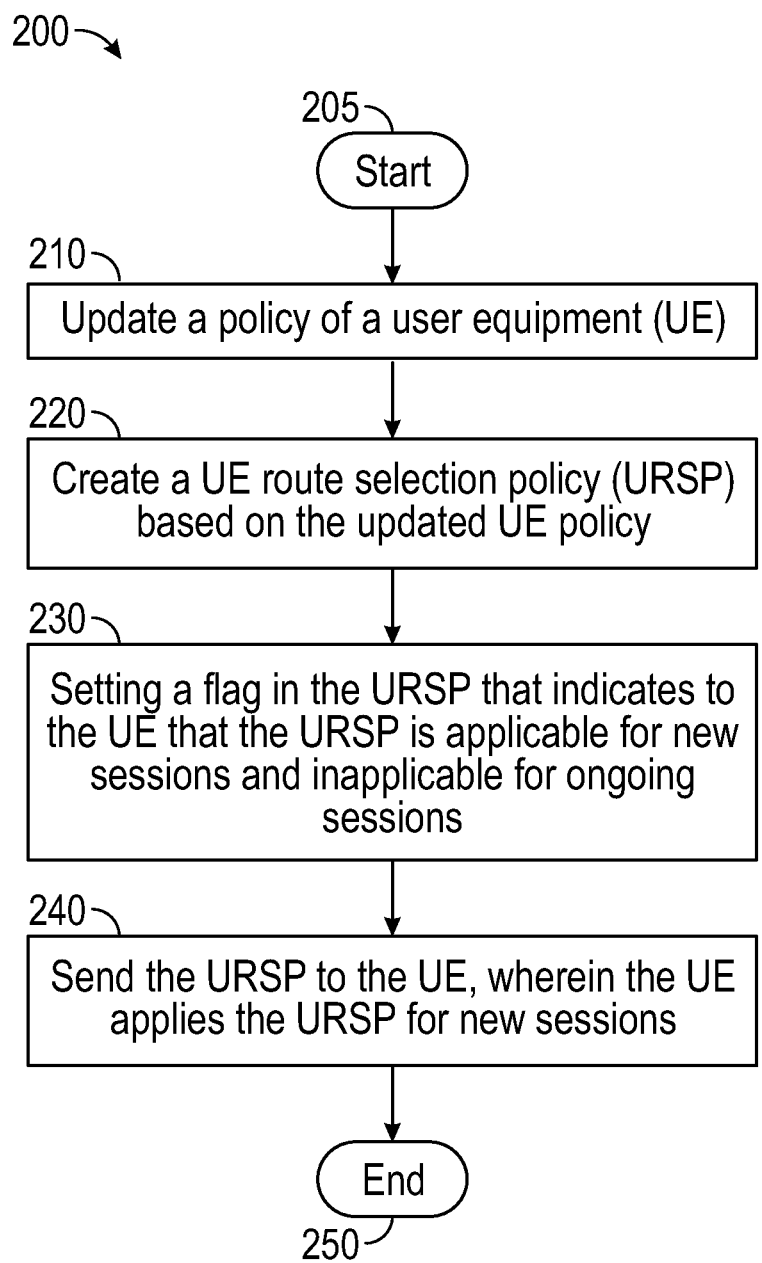
FIG. 2 is a flow chart of a method for provisioning user equipment route selection policies.

FIG. 2 is a flow chart of a method 200 for provisioning user equipment route selection policies. The method 200 may begin in starting block 205. The method 200 may proceed to operation 210, and a policy of a UE may be updated. For example, a PCF, such as PCF 108, may update a policy of a UE, such as UE 102. In an example, the PCF may update the UE policy in response to the UE moving from a 4G network to a 5G network.

Next, a URSP may be created based on the updated UE policy in operation 220. For example, the PCF may create the URSP based on the updated UE policy. The URSP may include one or more URSP rules.

Once the URSP is created, a flag in the URSP may be set in operation 230. The flag may indicate to the UE that the URSP is applicable for new sessions and inapplicable for ongoing sessions. For example, the PCF may set the flag to a value that may indicate to the UE that the URSP is applicable for new sessions and inapplicable for ongoing sessions. In another example, the PCF may set the flag to a value that may indicate the URSP is applicable for all sessions.

After the flag is set, the URSP may be sent to the UE, and the UE may apply the URSP for new sessions in operation 240. For example, the PCF may send the URSP to the UE 102, such as via AMF 106 and RAN 104 shown in FIG. 1, and the UE may apply the URSP for new sessions based on the value of the flag. The method 200 then proceeds to ending block 250.

Figure 3:
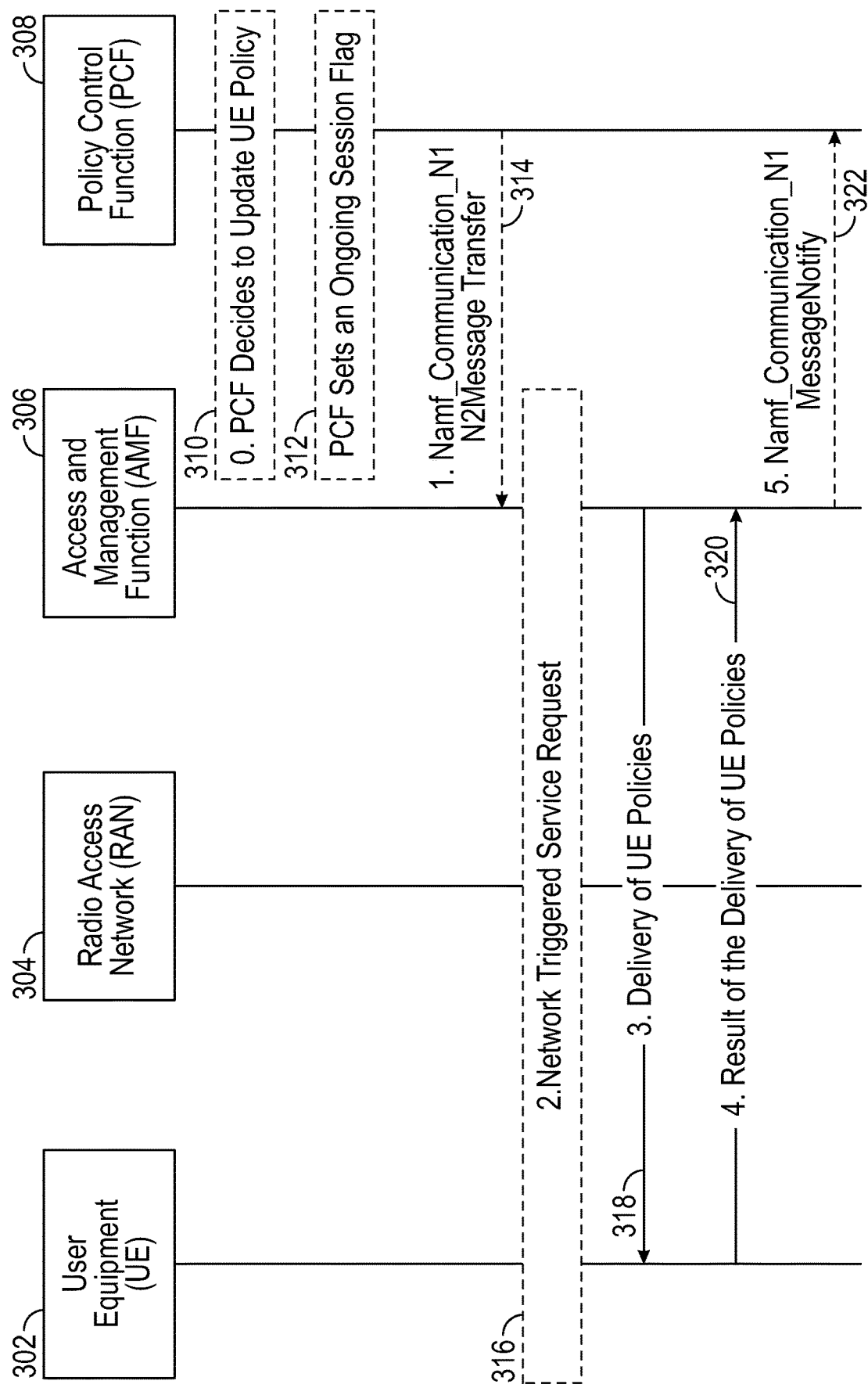
FIG. 3 is a signaling process between a user equipment, a radio access network, an application and mobility function, and a policy control function for provisioning user equipment route selection policies.

FIG. 3 is a signaling process 300 between a UE 302, a RAN 304, an AMF 306, and a PCF 308 for provisioning user equipment route selection policies. The signaling process 300 may begin with operation 310, and the PCF 308 may determine to update a UE policy. The PCF may create a URSP to cause the UE 302 to update the policy as the PCF 308 decided in operation 310. In operation 312, the PCF 308 may then set an ongoing session flag based on whether the updated policy should apply to all sessions or apply only to new sessions and not apply to ongoing sessions.

In signal 314, the PCF 308 may send a message to the AMF 306 instructing the AMF 306 to send the URSP to the UE 302. The message may include the URSP. In operation 316, a network triggered service request may be initiated to allow the AMF 306 to establish a connection with the UE 302. In signal 318, the AMF 306 may send to the UE 302, via the RAN 304, the updated UE policy via the URSP. The UE 302 may then apply URSP to only new sessions or all sessions based on the value of the ongoing session flag set by the PCF 308. In signal 320, the UE 302 may then send, via the RAN 304, the result of the delivery of the UE policy to the AMF 306. In signal 322, the AMF 306 may then send a message to the PCF 308 that indicates the results of the delivery of the UE policy to the UE 302 and thereby indicating the results of the UE applying the URSP.

Figure 4:
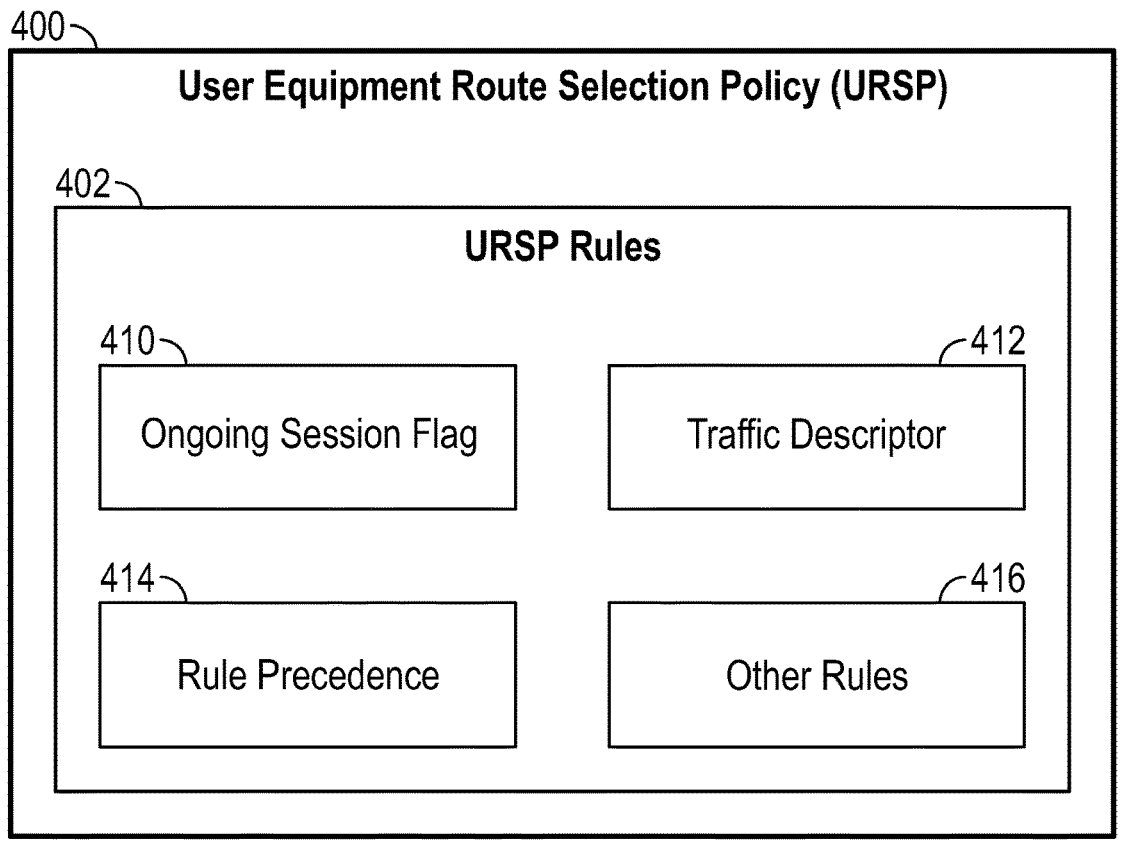
FIG. 4 is a block diagram of a user route selection policy.

FIG. 4 is a block diagram of a URSP 400. The URSP 400 includes URSP rules 402. The URSP rules 402 may include information for mapping a UE's data traffic to 5G session connectivity parameters. The URSP rules 402 may include an ongoing session flag 410, a traffic descriptor 412, a rule precedence 414, and other rules 416. The URSP rules 402 may include any number of rules.

The ongoing session flag 410 may comprise a flag that may be set to indicate that the URSP rules 402 apply to all sessions or set to indicate that the URSP rules 402 should only apply to new sessions and be inapplicable for ongoing sessions. For example, the ongoing session flag 410 may be assigned a value of zero when the URSP rules 402 should apply to all sessions, and the ongoing session flag 410 may be assigned a value of one when the URSP rules 402 should apply to new sessions and be inapplicable for ongoing sessions. A PCF, such as PCF 108 or PCF 308, may set the ongoing session flag 410 before initiating the process of sending the URSP 400 to a UE, such as UE 102 or UE 302.

The traffic descriptor 412 may specify the network slice the URSP rules 402 apply to. The rule precedence 414 may determine the precedence the URSP rules have to be enforced in the UE. The other rules 416 may include a Session and Service Continuity Mode Selection Policy, a Network Slice Selection Policy, a Data Network Name Selection Policy, a Protocol Data Unit Selection Policy, a Non-Seamless Offload Policy, and Access Type preference, and/or the like.

Figure 5:
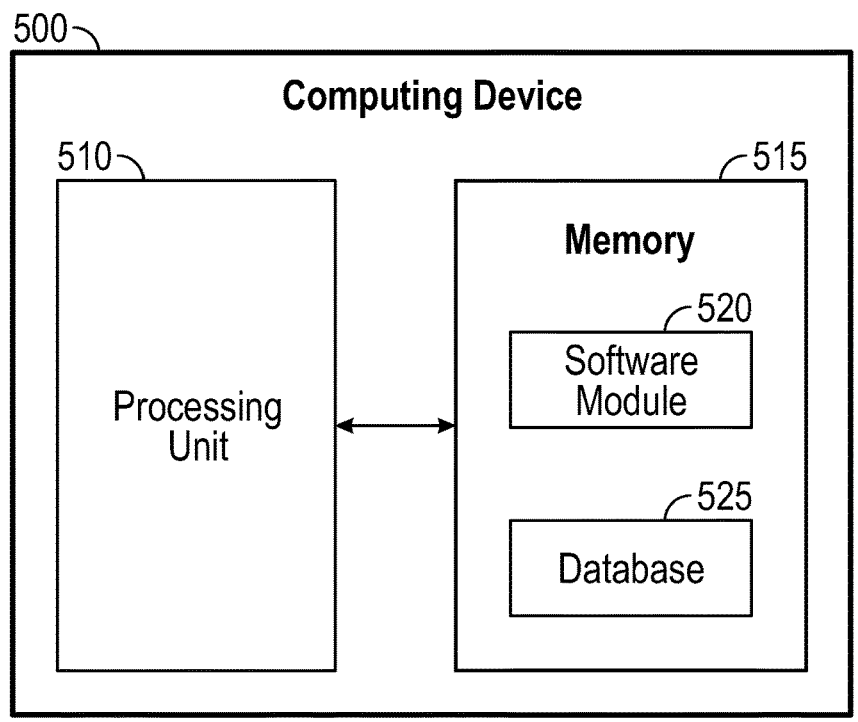
FIG. 5 is a block diagram of a computing device.

FIG. 5 is a block diagram of a computing device. As shown in FIG. 5, computing device 500 may include a processing unit 510 and a memory unit 515. Memory unit 515 may include a software module 520 and a database 525. While executing on processing unit 510, software module 520 may perform, for example, processes for provisioning URSPs as described above with respect to FIG. 1, FIG. 2, FIG. 3, and FIG. 4. Computing device 500, for example, may provide an operating environment for the UE 102, the RAN 104, the AMF 106, the PCF 108, the UE 302, the RAN 304, the AMF 306, the PCF 308, and/or any other system described herein. The UE 102, the RAN 104, the AMF 106, the PCF 108, the UE 302, the RAN 304, the AMF 306, the PCF 308, and/or any other system described herein may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
updating, by a Policy Control Function (PCF), a policy of a User Equipment (UE);
creating, by the PCF, a UE route selection policy (URSP) based on the updated UE policy;
setting, by the PCF, a flag in the URSP, wherein setting the flag comprises setting the flag in the USRP to a first value, wherein the first value indicates to the UE that the URSP is applicable for new sessions and inapplicable for ongoing sessions, and wherein setting the flag to a second value indicates to the UE that the USRP is applicable to all sessions; and
sending, to the UE, the URSP from the PCF, wherein the UE applies the URSP for new sessions.

2. The method of claim 1, further comprising receiving, by the PCF, a message indicating results of the UE applying the URSP.

3. The method of claim 1, wherein sending, to the UE, the URSP from the PCF comprises sending, to an Access and Management Function (AMF), the URSP from the PCF.

4. The method of claim 3, wherein sending, to the UE, the URSP from the PCF comprises sending, to the UE, the URSP from the AMF via a Radio Access Network (RAN).

5. The method of claim 1, wherein the URSP comprises a URSP rule, and wherein the UE applying the URSP for new sessions comprises applying the URSP rule for new sessions.

6. The method of claim 1, wherein the PCF updates the policy of the UE based on the UE moving from a Fourth Generation (4G) network to a Fifth Generation (5G) network.

7. The method of claim 1, wherein setting the flag in the URSP is based on the updated UE policy being non-compatible with ongoing sessions.

8. A system comprising:
a memory storage; and
a processing unit coupled to the memory storage, wherein the processing unit is operative to:
update a policy of a User Equipment (UE);
create a UE route selection policy (URSP) based on the updated UE policy;
set a flag in in the URSP, wherein setting the flag comprises setting the flag in the USRP to a first value, wherein the first value indicates to the UE that the URSP is applicable for new sessions and inapplicable for ongoing sessions, and wherein setting the flag to a second value indicates to the UE that the USRP is applicable to all sessions; and
send, to the UE, the URSP, wherein the UE applies the URSP for new sessions.

9. The system of claim 8, wherein the processing unit is further operable to receive a message indicating results of the UE applying the URSP.

10. The system of claim 8, wherein the processing unit being operative to send, to the UE, the URSP comprises the processing unit being operative to:

send, to an Access and Management Function (AMF), the URSP; and send, to the UE, the URSP from the AMF via a Radio Access Network (RAN).

11. The system of claim 8, wherein the URSP comprises a URSP rule, and wherein the UE applying the URSP for new sessions comprises applying the URSP rule for new sessions.

12. The system of claim 8, wherein the processing unit being operative to update the policy of the UE comprises the processing unit being operative to update the policy of the UE based on the UE moving from a Fourth Generation (4G) network to a Fifth Generation (5G) network.

13. The system of claim 8, wherein the processing unit being operative to set the flag in the URSP comprises the processing unit being operative to set the flag in the URSP based on the updated UE policy being non-compatible with ongoing sessions.

14. A non-transitory computer-readable medium that stores a set of instructions which when executed perform a method executed by the set of instructions comprising:

updating, by a Policy Control Function (PCF), a policy of a User Equipment (UE);

creating, by the PCF, a UE route selection policy (URSP) based on the updated UE policy;

setting, by the PCF, a flag in in the URSP, wherein setting the flag comprises setting the flag in the USRP to a first value, wherein the first value indicates to the UE that the URSP is applicable for new sessions and inapplicable for ongoing sessions, and wherein setting the flag to a second value indicates to the UE that the USRP is applicable to all sessions; and sending, to the UE, the URSP from the PCF, wherein the UE applies the URSP for new sessions.

15. The non-transitory computer-readable medium of claim 14, further comprising receiving, by the PCF, a message indicating results of the UE applying the URSP.

16. The non-transitory computer-readable medium of claim 14, wherein sending, to the UE, the URSP from the PCF comprises sending, to an Access and Management Function (AMF), the URSP from the PCF.

17. The non-transitory computer-readable medium of claim 16, wherein sending, to the UE, the URSP from the PCF comprises sending, to the UE, the URSP from the AMF via a Radio Access Network (RAN).

18. The non-transitory computer-readable medium of claim 14, wherein the URSP comprises a URSP rule, and wherein the UE applying the URSP for new sessions comprises applying the URSP rule for new sessions.

19. The non-transitory computer-readable medium of claim 14, wherein the PCF updates the policy of the UE based on the UE moving from a Fourth Generation (4G) network to a Fifth Generation (5G) network.

20. The non-transitory computer-readable medium of claim 14, wherein setting the flag in the URSP is based on the updated UE policy being non-compatible with ongoing sessions.

* * * * *